INVENTORS.
M. FREDERICK HOOVER
JOHN J. PADDEN
BY
William L. Krayer
ATTORNEY.

United States Patent Office 3,442,803
Patented May 6, 1969

3,442,803
THICKENED FRICTION REDUCER FOR WATER-BASED OIL WELL TREATING FLUIDS
Merwin Frederick Hoover, Bethel Park, and John J. Padden, Pittsburgh, Pa., assignors, by mesne assignments, to Calgon Corporation, a corporation of Delaware
Filed Jan. 19, 1966, Ser. No. 521,652
Int. Cl. E21b 43/25; C10m 7/26; C09k 3/00
U.S. Cl. 252—8.55     6 Claims

ABSTRACT OF THE DISCLOSURE

A method is disclosed of reducing friction in an aqueous oil well fracturing system by dissolving in the aqueous system a small amount of a copolymer of acrylamide and from about $1 \times 10^{-3}$ to $6 \times 10^{-3}$ weight percent methylene bisacrylamide. In a refinement of the process, a free-radical generating compound may also be used to degrade the polymer after its introduction into the formation.

---

Figure 1:
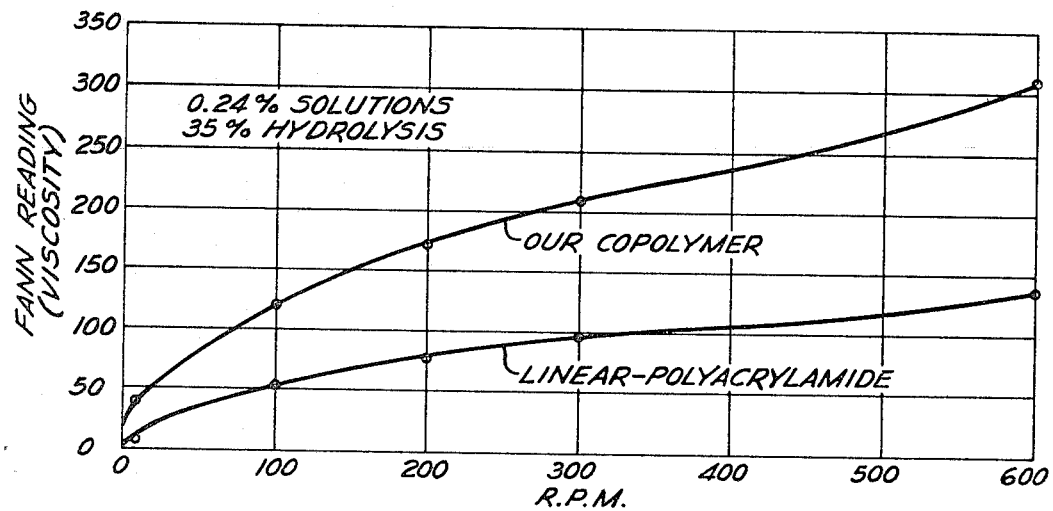

This invention relates to a thickened friction reducer for use in water-based fracturing and other treating fluids. Specifically, it relates to highly branched, water-soluble copolymers of acrylamide and N,N'-methylenebisacrylamide and their use in oil well fracturing, and to compositions including said copolymers and free radical-generating compounds.

In an oil well fracturing operation, a fluid is forced down a well bore under high pressure to fracture the rock formations surrounding the well bore. The pressure is then relieved, allowing the oil to seep through the fractures into the well bore where it is pumped to the surface. After the formation has been fractured, it is desirable to prevent the fractures from closing by propping them apart with a propping agent. Propping agents in wide use today include ground coconut shells, polystyrene beads, and glass balls, but the most common propping agent is sand.

Difficulties are often encountered in keeping the propping agent homogeneously dispersed in the fracturing fluid so that it is carried into the fractures and does not merely settle in the lower portions of the exterior pipes and in the well. This problem is solved by adding a thickening agent to the fracturing fluid in order to increase its viscosity; this thickened fluid is then capable of suspending the propping agent. Once the propping agent is in place, it is desirable to have the thickening agent degrade; degradation should decrease the viscosity to near the level it would be without the thickening agent. This is necessary because oil will not flow easily into the fractures of the formation when the viscosity of the fracturing fluid is high and remains in the fissured spaces. A good thickening agent must yield a high viscosity at a low concentration, be inexpensive, and preferably be capable of being degraded once it has carried the sand particules into the fractures (see Alter U.S. Patent 3,167,510); it should not leave insoluble precipitates or residues when it is degraded as these tend to plug the formations.

The amount of oil which can be obtained from a well depends to a great extent upon how extensively the rock formations can be fractured. This, in turn, depends upon the degree of pressure that is applied to the rock. Due to friction between the fracturing fluid and the pipe or rock and within the fracturing fluid itself because of turbulent flow, a significant amount of energy may be lost as the fluid travels from the earth's surface to the formation, and considerably less pressure may be actually applied to the rock than was orginally applied at the top of the well. This problem is minimized by adding a friction reducer to the fracturing fluid. A good friction reducer should cause a large decrease in friction when used in small concentrations, should be inexpensive, have shear, temperature, and pressure stability, and should not leave deposits which plug the formation.

Because of economics and the physical and chemical characteristics of many compounds now in use, few compounds can be used as both friction reducers and thickening agents. A compound which will function effectively as both a friction reducer and a thickening agent without leaving an undesirable residue is of great usefulness to the oilfield industry.

The polyacrylamides in current use as friction reducers are essentially linear homopolymers. In contrast, the copolymers of our invention are markedly different in their physical properties due to the high degree of branching (semi-network structure), which, while retaining the friction reducing properties of normal linear homopolyacrylamide, provides significantly more viscous aqueous solutions. Therefore, the copolymers of our invention are more economically utilizable as thickened friction reducers than normal linear homopolyacrylamide because they provide the desired solution properties at lower concentrations.

We have found that semi-network copolymers of acrylamide and N,N'-methylenebisacrylamide are effective both as friction reducers and as thickening agents. Our copolymers also have improved shear and temperature stability, are easily degradable, and do not leave insoluble residues when degraded. They are as effective as linear polyacrylamide in reducing friction, yet produce a fracturing fluid which is more viscous than that produced by linear polyacylamide and they have better shear stability.

While others have made insoluble cross-linked gels of acrylamide and methylenebisacrylamide (see, for example, Holbert et al. U.S. Patent 3,175,612, Cerwonka U.S. Patent 3,201,237, and Belgian Patent 646,012), no one has yet prepared a water-soluble semi-network copolymer of acrylamide and methylenebisacrylamide. A semi-network polymer is a branched polymer which has not been cross-linked beyond its gel point. The gel point is the point at which a polymer has been cross-linked to such an extent that its solution is transformed from a viscous, water-soluble liquid into an elastic, water-insoluble gel; it is an irreversible reaction. (See, for example, "Principles of Polymer Chemistry" by Paul J. Flory, page 47.) A polymer is considered to be soluble if it is capable of being solvated to a homogeneous solution having no discrete separatable particles.

The polymers of this invention are water-soluble and therefore have not been cross-linked beyond their gel point. The gel point of our copolymers is reached when the concentration of methylenebisacrylamide is about 0.008 weight percent of the acrylamide weight. Thus, the copolymers contemplated by this invention contain a maximum of about $6 \times 10^{-3}$ weight percent methylenebisacrylamide based on the acrylamide weight; preferably, they contain about $2 \times 10^{-3}$ to $6 \times 10^{-3}$ weight percent methylenebisacrylamide based on the acrylamide weight. Less than about $1 \times 10^{-3}$ weight percent methylenebisacrylamide does not produce a viscous enough fracturing fluid.

Table I illustrates the effect upon the solubility of a copolymer of acrylamide and N,N'-methylenebisacrylamide when the percent of methylenebisacrylamide in the copolymer increases.

TABLE I

35% hydrolyzed copolymer

| Concentration of methylenebisacrylamide in the copolymer as a weight percent of acrylamide: | Solubility |
| --- | --- |
| $1 \times 10^{-4}$ | Soluble. |
| $2 \times 10^{-4}$ | Do. |
| $6 \times 10^{-4}$ | Do. |
| $1 \times 10^{-3}$ | Do. |
| $1.5 \times 10^{-3}$ | Do. |
| $2 \times 10^{-3}$ | Do. |
| $2.5 \times 10^{-3}$ | Do. |
| $2.7 \times 10^{-3}$ | Do. |
| $3 \times 10^{-3}$ | Do. |
| $4 \times 10^{-3}$ | Do. |
| $6 \times 10^{-3}$ | Borderline. |
| $8 \times 10^{-3}$ | Insoluble. |
| $2 \times 10^{-2}$ | Do. |
| $5 \times 10^{-1}$ | Do. |
| 10 | Do. |

Thus, the gel point of the copolymer is reached when the concentration of methylenebisacrylamide is about 0.008%.

The concentration of methylenebisacrylamide in the copolymer has a direct effect upon the viscosity of solutions of the copolymer. Table II illustrates this relationship.

TABLE II

35% hydrolyzed and dried copolymer—0.24% solutions

| Concentration of N,N'-methylenebisacrylamide in the copolymer as a weight percent of acrylamide: | Dial reading at 300 r.p.m. on Fann viscometer #0.2 spring |
| --- | --- |
| $1 \times 10^{-4}$ | 136 |
| $1 \times 10^{-3}$ | 145 |
| $2.5 \times 10^{-3}$ | 150 |
| $4 \times 10^{-3}$ | 209 |
| $6 \times 10^{-3}$ | 257 |

The amide groups in our copolymers may be hydrolyzed up to about 40%. Preferably, they are about 3% to 35% hydrolyzed. That is, about 3% to about 35% of the amide groups are converted to carboxyl groups.

Our copolymers are prepared using standard polymerization techniques. The following is an example of the preparation of one of our copolymers.

A reactor fitted with an agitator, thermometer, reflux condenser, catalyst addition facilities and a heating jacket was charged with:

(a) 8.64 gallons $H_2O$
(b) 8.0 pounds acrylamide monomer
(c) 10 ml. of a 1.45 gm./100 ml. $H_2O$ solution of methylenebisacrylamide (0.145 gm. methylenebisacrylamide)
(d) 3.6 gm. tetrasodium ethylenediamine tetra-acetic acid The above 10% solution was adjusted to a pH of 6.5 and purged with nitrogen for one hour at 30° C. After purging 100 ml. of a solution containing 8.64 gms. of ammonium persulfate was added. The exothermic polymerization was initiated and controlled by feeding a solution of a sodium metabisulfite reducing agent into the reactor at a controlled rate. The temperature of the jacket of the reactor was maintained at approximately the same temperature as the polymerizing solution in order to conduct an essentially adiabatic polymerization. During the course of one hour, the temperature rose from 30° C. to 65° C. at which point the addition of the reducing agent was terminated. The polymer solution was held at 60° C. for one additional hour to insure completion of the reaction.

The resulting copolymer was then hydrolyzed to convert 35 mole percent of the amide groups to carboxylic groups. This hydrolysis was accomplished by slowly feeding 1535 ml. of a 45% KOH solution into the polymer solution at the rate of 44 ml./min. at 60° C. The solution was held at 60° C. for three hours under agitation. The copolymer was then drum dried to form a solid flaked product. Similar copolymers were prepared by the above procedure but were 0, 10, and 15% hydrolyzed. These copolymers were also significantly more viscous than the corresponding homopolymers of acrylamide.

The polyacrylamide used in comparative tests with our copolymer which are reported throughout this patent was prepared in exactly the same manner as our copolymer, but without the addition of methylenebisacrylamide.

Our copolymers will reduce friction to some extent even at very low concentrations. For oil well fracturing, however, it is preferable to add about ½ to 2 pounds of our copolymers to 1,000 gallons of water-based fracturing fluid to effectively reduce friction. By "water-based fracturing fluid" we mean a fracturing fluid which has water as a principal component. Water emulsions, acids, brines, and the like are also contemplated.

We have performed experiments which demonstrate the effectiveness of our copolymers in reducing friction. In these experiments, 240 p.p.m. of a friction reducer in water was circulated in a closed loop and the pressure drop at the beginning and end of the loop was recorded; from this data the percent that friction was reduced by the addition of the friction reducer could be measured. After ten minutes the solution was sheared for twenty minutes using a homogenizer and the percent friction reduction again determined. Table III shows that our copolymers are as effective as linear homopolyacrylamide in reducing friction and have greater shear stability.

TABLE III

| | Percent Friction Reduction | |
| --- | --- | --- |
| | Maximum | After 20 Min. of Shearing |
| Polyacrylamide (35% hydrolyzed) | 74.3 | 55.4 |
| Copolymer of acrylamide and 0.004% methylenebisacrylamide (35% hydrolyzed) | 74.8 | 62.4 |

Table IV shows the results, in terms of percent friction reduction, of several test runs in the same closed loop under the conditions stated. It will be seen that the more highly branched polymers have greater stability in calcium chloride brines, and also in fresh water for a short time.

TABLE IV.—FRICTION REDUCTION OF POLYMERS AND COPOLYMERS OF VARIOUS METHYLENEBISACRYLAMIDE CONTENT AND HYDROLYSIS

| Sample | Weight percent Methyl- enebis- acryl- amide | Percent Amide Groups Hydro- lyzed | Percent Friction Reduction, 2.4 g. Polymer/10 Liters | | | | | |
|---|---|---|---|---|---|---|---|---|
| | | | Fresh Water | | | 2% CaCl$_2$ | | |
| | | | 5 Min. | 10 Min. | 30 Min. | 5 Min. | 10 Min. | 20 Min. |
| 1 | 0 | 2.7 | 59.8 | 56.0 | | 59.5 | 54.7 | 47.3 |
| 2 | 0 | 11.1 | 71.0 | 71.0 | 49.4 | 61.5 | 55.6 | 46.9 |
| 3 | 0 | 17.2 | 69.5 | 69.5 | 54.0 | 59.5 | 52.0 | 42.3 |
| 4 | 0 | 28.6 | 72.0 | 72.0 | 56.2 | 49.4 | 38.5 | 30.0 |
| 5 | 0 | 33.2 | 74.0 | 74.0 | 56.6 | 43.8 | 33.6 | 24.0 |
| 6 | .004 | 5.6 | 66.2 | 63.4 | | 59.2 | 52.8 | 44.5 |
| 7 | .004 | 12.1 | 69.0 | 69.0 | 48.2 | 62.6 | 59.2 | 50.0 |
| 8 | .004 | 17.6 | 70.5 | 70.5 | 58.5 | 52.1 | 59.0 | 48.0 |
| 9 | .004 | 26.3 | 70.3 | 70.2 | 59.8 | 53.0 | 52.3 | 41.7 |
| 10 | .004 | 34.0 | 70.2 | 70.2 | 55.0 | 36.6 | 35.9 | |
| 11 | .006 | 4.2 | 65.2 | 63.8 | | 61.2 | 59.4 | 51.0 |
| 12 | .006 | 11.7 | 69.5 | 69.5 | 51.5 | 57.8 | 58.2 | 51.3 |
| 13 | .006 | 16.9 | 69.9 | 69.8 | 52.3 | 58.8 | 58.8 | 51.0 |
| 14 | .006 | 28.5 | 68.3 | 68.3 | 53.8 | 54.0 | 49.5 | 41.2 |
| 15 | .006 | 34.6 | 68.2 | 68.2 | 50.0 | | | |

Our copolymers will thicken a water-based fracturing fluid when added to it in concentrations of about 2 to 20 lbs./1,000 gallons; preferably about 5 to 10 lbs./1,000 gallons is added to achieve the desired viscosity.

Experiments were performed on a Fann viscometer to compare the thickening ability of our copolymers to linear homopolyacrylamide. Each polymer was made using the identical catalyst system and was hydrolyzed 35%; each was tested at 60° C. in a 0.24% water solution. FIGURE 1 indicates that our copolymers are about twice as thick as homopolyacrylamide, especially at high shear rates.

Figure 2:
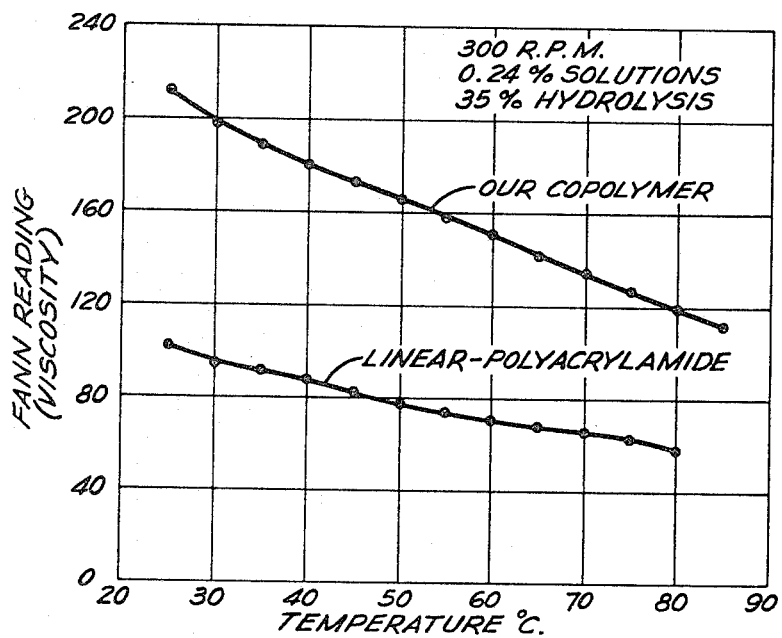

In addition to greater shear stability, we have also found that our copolymers have a temperature stability comparable to homopolyacrylamide. A sample of polyacrylamide and a sample of one of our copolymers containing $4 \times 10^{-3}$ weight percent methylenebisacrylamide (based on acrylamide weight) were prepared using the same polymerization method and catalyst system. A 0.24% solution of each was placed in a Fann viscometer at 300 r.p.m. and the temperature was gradually increased from 25° to 85° C. FIG. 2 shows that our copolymer maintained a viscosity about twice that of polyacrylamide under increasing temperatures.

We have found that our copolymers may be easily degraded by the addition of any water-soluble free radical-producing compound, preferably a persulfate or a perborate. Upon degradation our copolymers no longer form highly viscous solutions with water, but the solutions now have viscosities about the same as water. No insoluble precipitates remain after degradation.

Figure 3:
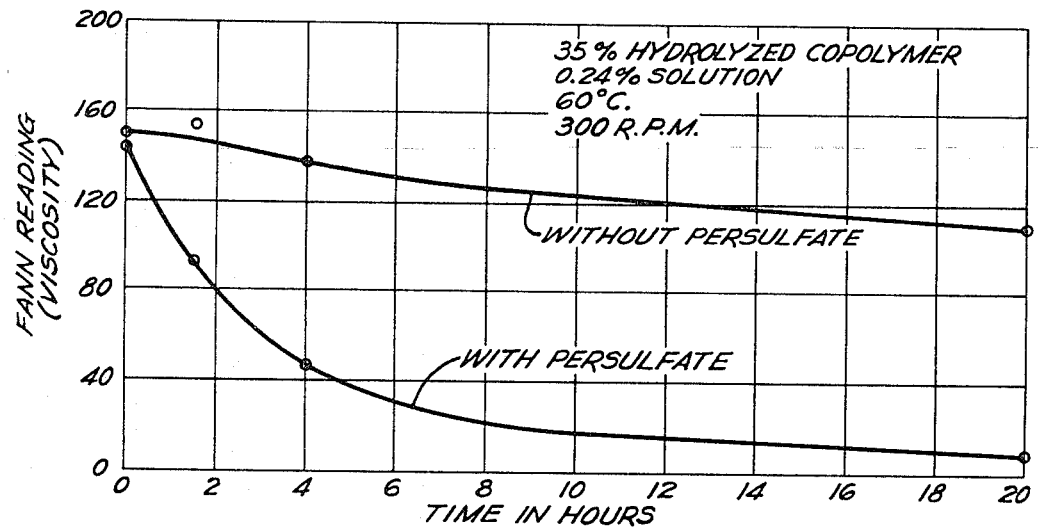

FIG. 3 shows the results of experiments on a Fann viscometer upon two samples of one of our copolymers containing $4 \times 10^{-3}$ weight percent methylenebisacrylamide (based on acrylamide weight); one sample also contained 0.02% ammonium persulfate. Both samples were tested in 0.24% water solutions at 60° C. and 300 r.p.m. After 20 hours, the persulfate sample degraded to the viscosity of water, while the other remained high.

Figure 4:
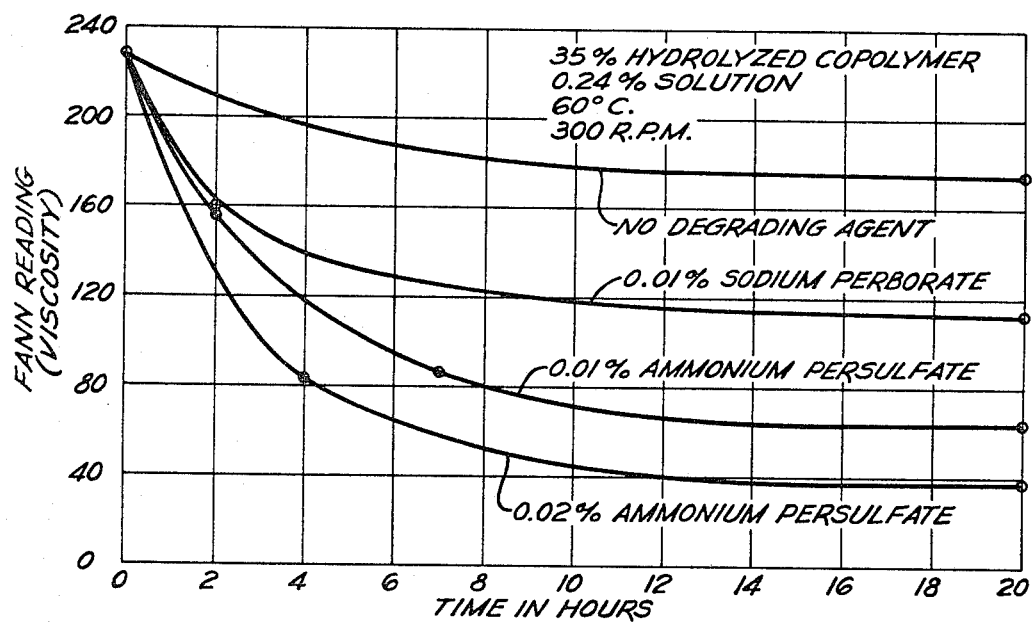

FIG. 4 shows the effect of sodium perborate and different concentrations of ammonium persulfate upon one of our copolymers containing $4 \times 10^{-3}$ weight percent methylenebisacrylamide (based on acrylamide weight). These experiments were conducted in the same manner as those of FIG. 3.

We have formulated a dry composition of our copolymer and a free radical-generating compound which will meet the requirements of most oil wells. This composition contains up to about 20.0% by weight water-soluble free radical-generating compound and the rest copolymer (e.g. a ratio of copolymer to free radical-generating compound no less than about 4:1); preferably, it contains about 5% to 15% by weight water-soluble free radical-generating compound and the rest copolymer. Our preferred copolymer and free radical-generating compounds are also preferred in this composition.

Thus, it may be seen that this invention relates to a highly branched water-soluble copolymer of acrylamide and methylenebisacrylamide, and to its use as a thickened friction reducer in oil well fracturing.

We do not intend to be limited to any copolymer, compounds, compositions, examples, or methods, disclosed herein for illustrative purposes. Our invention may be otherwise embodied and practiced within the scope of the following claims.

We claim:

1. A method of reducing friction in a water-based oil well fracturing fluid and of thickening said oil well fracturing fluid comprising adding thereto a copolymer of acrylamide and methylenebisacrylamide which copolymer is hydrolyzed up to 40% wherein the weight percent of the methylenebisacrylamide in said copolymer based on the acrylamide weight is between about $1 \times 10^{-3}$ and $6 \times 10^{-3}$ weight percent, and which copolymer is a semi-network.

2. The method of claim 1 wherein the weight percent of methylenebisacrylamide in said copolymer based on the acrylamide weight is between about $2 \times 10^{-3}$ and $6 \times 10^{-3}$ weight percent.

3. The method of claim 1 wherein said copolymer is hydrolyzed about 10% to about 35%.

4. The method of claim 1 wherein said copolymer is hydrolyzed about 10% to about 35% and the weight percent of methylenebisacrylamide in said copolymer based on the acrylamide weight is between about $2 \times 10^{-3}$ and $6 \times 10^{-3}$ weight percent.

5. The method of claim 1 in which said copolymer is added in an effective amount no greater than about 20 pounds per 1,000 gallons of fracturing fluid.

6. Method of claim 1 in which a free-radical generating compound selected from the group consisting of persulfates and perborates is added to the fracturing fluid in an amount no greater than about one-fourth by weight of the copolymer.

References Cited

UNITED STATES PATENTS

| 3,102,548 | 9/1963 | Smith et al. | 137—13 |
| 3,153,450 | 10/1964 | Foster et al. | 252—8.55 X |
| 3,167,510 | 1/1965 | Alter | 252—8.55 |
| 3,252,904 | 5/1966 | Carpenter | 252—8.55 |
| 3,254,719 | 6/1966 | Root | 166—42 |

HERBERT B. GUYNN, *Primary Examiner.*

U.S. Cl. X.R.

137—13; 166—42